United States Patent [19]

Rony et al.

[11] 3,855,307

[45] Dec. 17, 1974

[54] CATALYSIS

[75] Inventors: Peter R. Rony, St. Louis; James F. Roth, Creve Coeur, both of Mo.

[73] Assignee: Monsanto Company, St. Louis, Mo.

[22] Filed: Feb. 6, 1968

[21] Appl. No.: 703,382

Related U.S. Application Data

[63] Continuation-in-part of Ser. No. 617,338, Feb. 20, 1967, abandoned.

[52] U.S. Cl. .......... 260/604 HF, 252/426, 252/428, 260/683.9, 260/683.68, 260/604 AC, 260/497 R, 260/586 R, 260/631 R, 260/532, 260/488 K, 260/614 R, 252/429 R
[51] Int. Cl............................................. C07c 45/08
[58] Field of Search.............................. 260/604 HF

[56] References Cited
UNITED STATES PATENTS

| | | | |
|---|---|---|---|
| 3,487,112 | 12/1969 | Paulik et al. | 260/604 HF |
| 3,352,924 | 11/1967 | Gladrow et al. | 260/604 |
| 3,239,566 | 3/1966 | Slaugh et al. | 260/604 |

FOREIGN PATENTS OR APPLICATIONS

| 651,275 | 3/1951 | Great Britain |
|---|---|---|

OTHER PUBLICATIONS

Evans et al., Nature, Vol. 208, pages 1203–1204, 1965.
Bennett et al., Chemistry and Industry, page 846, 1965.

*Primary Examiner*—Leon Zitver
*Assistant Examiner*—R. H. Liles

[57] ABSTRACT

This invention relates to multiphase catalysts, the preparation of the said catalysts, and catalytic processes employing such catalysts. The multiphase catalysts are comprised of a porous solid carrier upon which a liquid-phase catalyst is disposed. The liquid-phase catalyst includes liquid compounds which have catalytic activity, and also dissolved and dispersed solutes in a solvent. The multiphase catalysts are prepared by absorbing the liquid phase on the porous solid carrier, and may also have the liquid phase dissolved in a low boiling solvent which is later removed. The latter procedure provides intimate dispersion. The catalytic processes employing the multiphase catalysts include hydroformylation, isomerization, oxidation, carbonyl conversion and carbonylation reactions.

2 Claims, 1 Drawing Figure

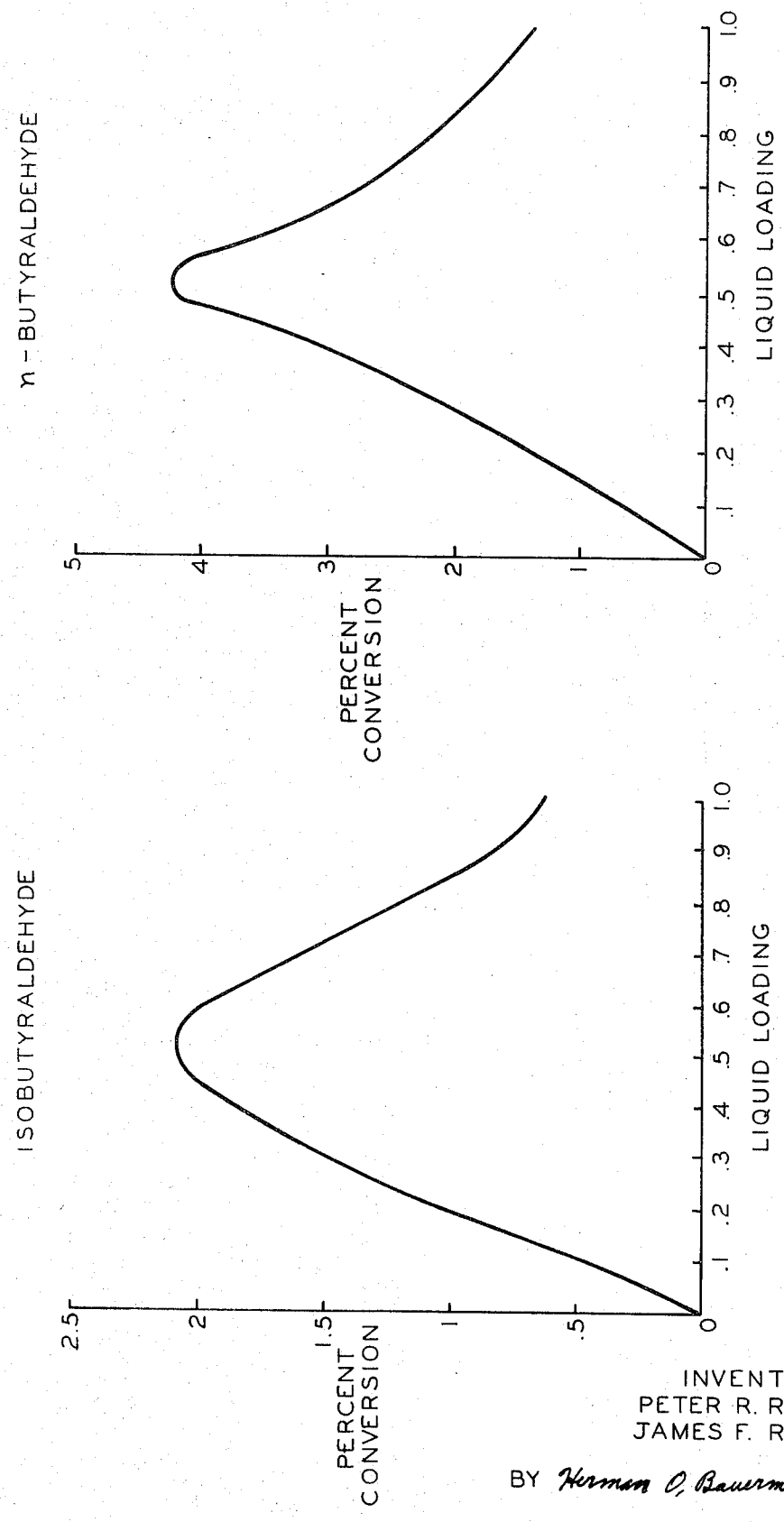

CATALYSIS

The present patent application is a continuation-in-part of U.S. application Ser. No. 617,338 filed Feb. 20, 1967, and now abandoned.

This invention relates to catalysts and catalytic processes. Catalytic methods have generally utilized either solid-phase or liquid-phase catalysts, each type being characterized by certain advantages and disadvantages. The solid forms of catalysts when used with gaseous or liquid reactants have good physical strength and may be provided with large surface areas to obtain effective contacting areas for the reactants. However, the solid-phase catalysts suffer certain disadvantages, such as not containing a high degree of dispersion of active sites. The active sites are in general disposed on the surface of crystallites in such a way that they are often in close proximity. This has the effect of limiting selectivity. For example, sequential reactions leading to side products may occur more readily when there is a high density of active sites. In addition, certain catalytic moieties are not stable, and are not present in significant amounts in the solid state, whereas they can be in the liquid state.

The liquid-phase catalysts generally employed with gaseous reactants, for example in a sparged or stirred reactor, overcome some of the selectivity and activity limitations of solid catalysts, but the effective interface area for reaction is relatively small, and the liquid diffusion paths are relatively long, so that the efficiency is not always sufficient for industrial reactions. Furthermore the requirements for the proper agitation or sparging of liquid reaction systems imposes severe limitations upon the gas flow rates and other parameters of the reactor so that considerable equipment is necessary to provide the proper sparging or mixing conditions. It is also found that the use of liquid-phase catalysts composed of solutions of salts of metals usually results in attrition and plating out of the metal on the walls of the reactor system, so that the catalyst is lost and the reactor conversion falls. The use of solutions of salts of metal components also promotes severe corrosion and fouling of the reactor by the catalyst solution, so that expensive materials of construction are often necessary.

It has now been found that it is possible to provide the combination of liquid-and-solid phase catalysts in a single unitary, multiphase catalytic entity. The multiphase catalysts of the present invention are composed of a porous solid support having a liquid-phase catalyst present. The liquid-phase catalyst may be a single component which is liquid under reaction conditions, and may also be comprised of a liquid solvent containing dissolved or dispersed catalystic components such as metal salts. The liquid-phase catalyst is disposed upon porous supports or substrates. Accordingly, the term "catalyst" is employed herein as referring to the liquid-phase including liquid compounds per se, and also dissolved or dispersed solutes in a solvent.

In the present invention the multiphase catalyst supplied a supported liquid phase but externally behaves like a solid catalyst which is free flowing, and can be used in fixed or fluidized-bed reactors while at the same time providing the advantages of liquid catalysts, including the selectivity which is provided by the desired catalyst component in melt or solution form. An advantage over the solid catalysts of the prior art is that the present multiphase catalysts operate at less severe reaction conditions of temperature and pressure, while providing higher gas-liquid interfacial areas and considerably reduced liquid diffusion paths in comparison to typical liquid-phase catalytic systems.

The present use of supported liquid-phase catalysts also eliminates the problems of catalyst attrition, plating of the catalyst on the reactor walls, as well as fouling and corrosion of the reactor because there is no free catalyst solution present in direct contact with the reactor system walls and components.

The use of the present multiphase catalyst in various vapor-phase processes such as dehydrogenation, alkylation, esterification, dehydration, hydration, arylation, sulfonation, nitration, halogenation, etc. also eliminates the prior art problems of separation of catalysts from the products while permitting the existence of long gas-liquid contact times.

The carrier or substrate which is employed in the present multiphase catalysts consists of a porous solid of such size that it can be employed in fixed-or fluidized-bed reactors, e.g., from 400 mesh/inch to ⅜-inch particle sizes. The range of variation of the pore volume relative to solid weight is from 0.01 to 5.0 $cm^3$/gram of the porous phase, with a preferred range of from 0.05 to 2.0 $cm^3$/gram. The macropore volume (pores greater than 100 A diameter) should be at least 10 percent of the total pore volume.

The carrier materials are exemplified, but not limited by pumice, alumina gel, silica gel, silica-alumina gel, aged or deactivated silica-alumina cracking catalyst, magnesia, diatomaceous earth, bauxite, titania, zirconia, clays, both natural and acid treated such as the Super-Filtrols, attapulgus clay (attapulgite), lime, magnesium silicate, carborundum, activated and inactivated carbons, zeolites as well as the zeolite molecular seives, solid foams, such as ceramic honeycombs, porous organic polymers such as macroreticular ion-exchange resins, poromeric polymers, porous cross-linked polystyrene, porous Teflon, polycarbonate, polyurethane, polyethylene, and polypropylene. The above carriers are used as regular and irregular particles and as capillary tubes, meshes, fabric meshes, and interspacing elements such as shapes, extrudates, ceramic rods, balls, broken pieces, tiles, and the like disposed within the reactor.

The carrier material can also have modifiers or deactivators present from impregnation or spraying processes before or after the deposition of the liquid catalytic solution in order to prevent changes to the catalytic components from occurring as a result of interactions between the catalytic components and the unmodified carrier material.

The present discussion is concerned with multiphase catalysts containing a liquid catalytic component dispersed upon a porous solid in which the solid phase is substantially inert. It has also been found that a polyfunctional multiphase catalyst can be provided which is comprised of a liquid phase dispersed upon a porous solid in which the solid phase is activated by the liquid-phase component. It has been unexpectedly observed that the action of further increasing the amount of activating liquid component beyond an optimum produces a diminution of the activating effect, thus exhibiting not an increase but a decrease in overall catalytic activity. These activation-deactivation-modification effects can be achieved by quite low levels of the modifying component.

In order to provide the multiphase catalyst of this invention, the above described carrier or support has dispersed thereon a catalytic component which is present under reaction conditions as a liquid phase. This may be comprised of a liquid catalytic compound or may be comprised of one or more liquid or solid catalytic components dissolved or dispersed in a medium which is liquid under the reaction conditions.

The above liquid-phase catalytic entity is an inorganic, organic, or metallo-organic component. A preferred class is comprised of at least one metal catalytic component such as a salt, for example palladium dichloride, or a metal complex containing various ligands, such as cobalt carbonyl or rhodium bis(triphenyl phosphine) carbonyl chloride. The solvent when such is employed to dissolve or disperse the metal catalyst component may also be comprised of the same or other ligands as discussed herein.

The metal catalytic components which are useful in the present invention include the transition metals, the Group III, Group IV, and Group V metals, the rare earths of the lanthanum series, thorium and uranium, as well as the alkaline earth and alkali metals, employed singly or as mixed metal compounds with at least one ligand. The transition metals as employed herein include chromium, manganese, titanium, vanadium, iron, cobalt, nickel, copper, zinc, zirconium, niobium, molybdenum, ruthenium, rhodium, palladium, silver, cadmium, hafnium, tantalum, tungsten, rhenium, osmium, iridium, platinum, gold, and mercury, constituting a preferred embodiment of the invention.

The Group III, Group IV, and Group V metals as employed herein include aluminum, gallium, indium, thallium, germanium, tin, lead, antimony, and bismuth, also constituting a preferred embodiment of the invention. The rare earths of the lanthanum series metals as employed herein include cerium, praseodymium, neodymium, samarium, europium, gadolinium, terbium, dysprosium, holmium, erbium, thulium, ytterbium, and lutetium. Non-metals which are useful in the present invention include boron, sulfur, selenium, and tellurium.

The aforesaid metals are used as the cations of salts and as the central components of metal complexes with the ligands discussed herein. However, free metal (zero valent) catalysts are also included in the invention as combinations with metal compounds and solvents in the multiphase catalysts.

The term ligand used herein means an atom, radical, ion, or molecule which is bound to the central atom in a polyatomic compound, for example, chloride anion, carbon monoxide, and triphenyl phosphine in rhodium bis(triphenyl phosphine) carbonyl chloride. Here rhodium is the central atom. The term metal complex used herein means a compound which is made up structurally of a central metal atom and one or more ligands. The term oxygen acid used herein means a compound which is made up structurally of a central atom or atoms with only hydroxyl or oxygen ligands.

The ligands which are used in the metal catalyst combinations to provide a liquid-phase active catalyst solution dispersed upon a porous substrate are exemplified by chloride, bromide, iodide, carbonyl, triphenyl phosphine, triphenyl phosphite, cyclopentadienyl, ethylene and methyl ligands. However, the organic and inorganic ligands which may be used are quite broad, including as representative examples, molecular hydrogen, oxygen, or nitrogen; monatomic or ionic hydrogen, oxygen, or nitrogen, such as the hydride and oxygen anions; halide anions, such as fluoride, chloride, bromide, and iodide; anions of oxygen acids, such as sulfate, phosphate, phosphite, borate, perchlorate, silicate, germanate, sulfite, nitrate, carbonate, iodate, selenate, arsenate, dithionate, diphosphate, chromate, cobaltate, hypophosphite, niobate, stannate, vanadate, plumbate, tellurate, etc.; molecules, such as ammonia, water, carbon monoxide, carbon monosulfide, carbon dioxide, nitrogen monoxide, nitrogen monosulfide, nitrogen oxide, hydroxylamine, hydrazine; amide, azide, cyanide, cyanate, thiocyanate, cyanamide, dicyanamide ions; hydroxide, oxyfluoride, oxychloride ions; organic derivatives of the Group VIA elements, which are comprised of carboxylic acids, thiocarboxylic acids, alcohols, thioalcohols, ketones, diketones, thioketones, thiodiketones, aldehydes, thioaldehydes, ethers, thioethers, glycols, cyclic ethers and thioethers, carboxylic acid anions, alcohol anions, etc., such as acetic acid, acetate anion, benzoic acid, benzoate anion, dithiobenzoic acid, dithio oxalate, methanol, ethanol, propanol, ethylene glycol, 2,4-pentadione, 1,4-butanedione, quinone, hydroquinone, phenol, oxalic acid, oxalate ion, selenoacetate anion, lactic acid, maleic acid, crotonic acid, malic acid, tartaric acid, etc.; hydrogen, halide, and substituted and non-substituted alkyl, aryl, aryloxy, and alkoxy, and mixed organic derivatives of the Group VA elements, comprising alkyl and aryl phosphines, arsines, and stibines, amines, diimines, diamines, imines, chloroamines, etc., such as triphenyl phosphine, triphenyl phosphite, triphenyl arsine, triphenyl stibine, triethyl amine, triphenyl amine, ethylamine, 1,4-butanediamine, ethylene diimine, bis(salicylaldehyde)ethylene diimine, bis(acetylacetone) ethylene diimine, bis(benzoylacetone) ethylene diimine, propylenediamine, piperidine, ethylenediamine tetraacetic acid, ethylene diamine, diethylenetriamine, chloramine; hydrogen, halide, and substituted and non-substituted alkyl, aryl, alkoxy, and aryloxy, and mixed derivatives of the Group IVA elements, comprising alkyls, aryls, alkyl silanes, alkyl germanes, alkyl stannanes, chloro germanes, chloro stannanes, chloro silanes, etc., such as methyl, ethyl, butyl, benzyl, phenyl, trimethyl germyl, trimethyl stanyl, trimethyl silyl, methyl diphenyl germyl, methyl diphenyl silyl, germanium (II) chloride, tin (II) chloride, etc.; substituted and non-substituted amino acids, such as glycine, alanine, histidine, serine, cystine, threonine, valine, leucine, isoleucine, tyrosine, methionine, aspartic acid, glutamic acid, etc.; substituted and non-substituted sugars and alkaloids, such as cyclohexamylose, cycloheptamylose, quinine, cinchinodine, cinchonine, etc., organic ligands, and substituted derivatives thereof, capable of pibonding, comprising olefins, diolefins, cyclic olefins, cyclic diolefins, cyclic triolefins, acetylenes, nitriles, isonitriles, benzenoid aromatics, polynuclear benzenoid aromatics, heteronuclear aromatics containing O, N, S, Se, Te, P, As, Sb, B, Si, Ge, and Si hetero atoms, etc., such as benzene, ethylene propylene, butene, butadiene, pentadiene, hexadiene, heptadiene, octadiene, vinyl alcohol, vinyl acetate, benzonitrile, acrylonitrile, cyclo heptatriene, cycloheptatrienone, cyclohexene, cycloheptene, cyclo octadiene, cyclo octatriene, cyclooctene, cyclooctatrienone, naphthalene, pyridine, quinoline, 8-hydroxy quinoline, phenanthroline, 2,2'-bipyridine, alpha-picoline, phthalocyanine, porphyrin, etc. Combinations of ligands may also be present.

The solvent which is used to dissolve or disperse the metal catalytic component is a material having low vapor pressure under reaction conditions. The range of variation of the vapor pressure at reaction conditions expressed in millimeters of mercury is from $10^{-12}$ to 10 millimeters, a preferred range being from $10^{-10}$ to 1 mm.

An alternative possibility is to use solvents with higher vapor pressures and to presaturate the feed gas with these solvents prior to contacting with the catalyst bed.

The organic and inorganic solvents which may be used as a component of the multi-phase catalyst of the present ivention are quite broad in scope, including high-boiling substituted and non-substituted paraffin and aromatic hydrocarbons such as hexadecane, octadecane, hexatriacontane, squalane, chlorinated hydrocarbon oil of M.W. 326, liquid paraffin, mineral oil, napthalene, phenanthrene, 1-methyl napthalene, benzyldiphenyl, chlorinated biphenyls, etc.; high-boiling substituted and non-substituted organic alcohols, glycols, polyglycols, ethers, and polyethers, such as glycerol, carbitol, dulcitol, erythritol, polyethylene glycol, polypropylene glycol, diglycerol, diethylene glycol, tridecanol, triethylene glycol, tetraethylene glycol, 2-ethyl-1,3-hexanediol, 1,5-pentanediol, methoxy polyethylene glycol, diethylene glycol monomethylether; polybutylene glycol, 1,2,4-butanetriol, diphenyl ether, polyphenyl ether, methyl benzyl ether, bis(phenoxyphenyl) ether, tetraethylene glycol dimethyl ether, etc.; high-boiling substituted and non-substituted organic esters such as diisodicyl phthalate, dibutyl phthalate, dioctyl phthalate, bis(2-ethylhexyl) phthalate, dinonyl phthalate, didecyl phthalate, butyl benzyl phthalate, isooctyl isodecyl phthalate, butyl decyl phthalate, bis(2-tetrahydrofurfuryl) phthalate, dipropyl tetrachlorophthalate, bis (2-ethylhexyl) tetrachlorophthalate, dioctyl sebacate, bis(2-ethylhexyl) sebacate, dibutyl tetrachlorophthalate, 2-ethylhexyl isodecyl phthalate, bis (1-ethylhexyl) adipate, bis(n-octyl) adipate, bis(n-decyl) adipate, bis(cyclohexyl) phthalate, diisooctyl phthalate, diisodecyl adipate, dimethyl phthalate, diphenyl phthalate, methyl phthalyl ethyl glycollate, ethyl phthalyl ethyl glycollate, butyl phthalyl butyl glycollate, tristearin, 1,3-propanediol dioleate, 1,4-butanediol dioleate, 1,6-hexanediol dioleate, diethylene glycol dioleate, polyethylene, glycol dioleate, polyethylene glycol monoleate, polyethylene glycol polyadipate, diethylene glycol polyazelate, ethylene glycol distearate, polyethylene glycol adipate, polypropylene glycol adipate, polytriethylene glycol phthalate, diglycollic acid polyester, polyethylene glycol succinate, neopentyl glycol succinate, acetyl tri-2-ethylhexyl citrate, polydiethylene glycol succinate, polypropylene sebacate, polyoxyalkalene adipate, polydiethylene glycol adipate, glycol diacetate, glyceryl triacetate, butyl diglycol acetate, dibutyl diglycol, pentaerythritol adipate, 1,4-butanediol succinate, 1,4butanediol adipate, sucrose acetate isobutyrate, etc.; high-boiling substituted and non-substituted organic derivatives of nitrogen, sulfur, and phosphorous, such as thioglycol, toluene sulfonamide, n-ethyl toluene sulfonamide, cresyl phenyl phosphate, tri-m-tolyl phosphate, tricresyl phosphate, trixylenol phosphate, trixylyl phosphate, triphenyl phosphate, dibutyl phenyl phosphate, 2-ethylhexyl diphenyl phosphate, perfluorotributylamine, diphenylformamide, dimethylformamide, quinoline, 2-methyl quinoline, 4-methyl quinoline, N,N-bis(2-cyanoethyl) formamide, aniline, alpha-napthylamine, N-phenyl naphthylamine, triethanolamine, isoquinoline, diethanolamine, N-aminoethyl ethanolamine, N-methyl diethanolamine, triisopropanol amine, N-aminoethyl piperazine, N-aminoethyl piperazine, diphenyl amine, dimethyl sulfolane, N-propyl sulfone, polythiothiadiazole, etc., benzoquinoline, triazole, N-N-dimethyl acetamide, tetramethylene sulfone, N-methyl acetamide, other high-boiling substituted and non-substituted organic derivatives of oxygen, such as propylene carbonate, carboxylic acids, polycarboxylic acids, etc.; high-boiling substituted derivatives of silicon, such as tetra (2-ethylbutyl) orthosilicate, tetra (2-ethylhexyl) orthosilicate, silicones, polydimethyl siloxane, etc.; high-boiling inorganic or organic salts, such as cupric acetate, zinc acetate, potassium oleate, mixed alkali halide eutectics such as KCl/liCl 50 mole percent eutectic, alkali halide/aluminum halide eutectic melts, alkali halide/copper halide eutectic melts, alkali halide/silver halide eutectic melts, alkali halide/alkaline earth halide eutectic melts, mixed alkali nitrate eutectic melts, and other eutectic and non eutectic melts of inorganic compounds, pyridinium chloride, etc. as representative solvents. However, other non-aqueous high-melting liquids, electrolyte solutions, liquid metals and alloys and also colloidal suspensions, polymer suspensions, and enzyme solutions, etc. are also useful in specific applications of the invention.

Another class of catalytic components which are useful in the present invention include the general class of acids and bases, used individually and as mixtures, comprised of oxygen-, sulfur-, nitrogen-, phosphorus-, arsenic-, or antimony-containing organic compounds, such as pyridine, acetic acid, acetate anion, triphenyl phosphine, triphenyl arsine, triphenyl stibine, thioacetic acid, methoxy anion, imidazole, phenol, benzene solfonic acid, benzene sulfonate anion, benzene phosphate anion, etc., and also comprised of alkoxy, alkyl, halide, and other derivatives of metals as discussed above.

In general in catalysis it is found that increasing the amount of catalyst in a composite catalyst, for example, by increasing the amount of platinum upon a carrier such as alumina increases the activity although a plateau of activity is generally reached upon which only small increases are afforded with further increases in the loading of the active catalytic component. Quite unexpectedly, it has been found that this relationship does not apply to the present multiphase catalyst systems of the present invention. It has been observed that in the present catalysts the action of increasing the proportion of the liquid phase catalyst relative to the pore volume of the carrier, e.g., the catalyst loading, actually produces not an increase but a decrease in catalytic activity. Thus a critical parameter of the present multiphase catalyst is the liquid loading, expressed as the fraction of the total pore volume occupied by the liquid phase. Control of the liquid loading is essential in order to achieve maximum effectiveness in the activity of the catalyst and to achieve optimum utilization of the catalytic components. Since in many cases the catalytic components will consist of expensive materials, their optimum utilization is quite essential. The range of variation of the liquid loading is from 0.10 to 0.80 cm³liquid/cm³ pore volume, a preferred range being from 0.15 to 0.75. It is found that catalytic activity drops off distinctly outside of these ranges.

Certain preferred methods have also been found to be advantageous in the preparation of a multiphase catalyst of the present invention. It has been found that if a solid carrier is immersed in an excess of a liquid solution, and the excess subsequently removed, the composite catalyst thus obtained will contain substantially 1.00 liquid loading, e.g., complete saturation. However, if such a saturated porous carrier is utilized in a chemical process under normal conditions of elevated temperatures, the excess solution will exude from the catalyst carrier 1.00, such solution will be lost. On the other hand, if the support is contacted with insufficient solution to fill the total pore volume of the porous support, the distribution of the liquid phase among the particles of the porous carrier becomes very nonuniform, and in addition, there is a substantial fraction of the particles containing liquid loading of 1.00 with many particles being deficient in the liquid solution. It has therefore been found desirable to employ a special procedure in order to achieve uniform liquid loadings which are substantially less than 1.00. corresponding to saturation, and specifically in the preferred ranges of liquid loading as set forth above.

It has been found that the preparation of a supported multiphase catalyst which is uniform in composition and contains substantially less than 1.0 liquid loading, e.g., the range of from 0.10 to 0.80 liquid loading fraction, is preferably accomplished by the use of both non-volatile and more volatile solvent components in the impregnation of an initially dry porous support with a catalytic component dissolved in the said solvents. The vapor pressure of the non-volatile liquid catalytic component existing as a single liquid or a mixture is in the range of from $10^{-12}$mm to 10 mm Hg at 100°C. The vapor pressures of the volatile solvent components are at least ten times that of the vapor pressure of the aforesaid non-volatile liquid catalytic components. The impregnated support, at this stage with a liquid loading of substantially 1.00, is then maintained at a temperature sufficient to volatilize the more volatile solvent, preferably at a temperature between 10°C and 250°C, to permit drying of the composite. A vacuum may also be applied to the composite in order to volatilize the volatile solvent component, although the use of vacuum is not essential. During this stage of the process, the volatile solvent components evaporate from the compose catalyst.

Examples of the volatile solvent given below are based upon the existence of two solvents (non-volatile and volatile) with the limitation that the vapor pressure of the volatile component is at least ten times that of the vapor pressure of the non-volatile liquid, e.g., the liquid catalytic component. The dissolved or dispersed metal compounds do not greatly change the vapor pressure. A preferable group of volatile solvents, such as chloroform, carbon tetrachloride, benzene, acetone, methanol, ethanol, isopropanol, isobutanol, pentane, hexane, cyclohexane, heptane, toluene, pyridine, diethylamine, acetaldehyde, acetic acid, hydrofuran have vapor pressures of at least 20 mm Hg (STP).

The final product is a supported liquid-phase catalyst containing substantially no volatile solvent, of uniform liquid-phase composition and liquid loading substantially in the range of from 0.10 to 0.80 cm³ liquid/cm³ pore volume, a preferred range being from 0.15 to 0.75. Any desired liquid-loading level can readily be achieved by the appropriate choice of the ratio of the volume of non-volatile liquid catalytic component to the volume of the volatile solvent components in the catalyst solution used to prepare the multiphase catalyst. The ratio of the volume of the liquid catalytic component to the volume of the more volatile solvent components is from 0.11 to 4.0 a preferred range being from 0.18 to 3.0.

The following examples illustrate specific embodiments of the present invention, and also represent certain of the data of the examples in a Drawing. The drawing illustrates the relationship between the catalytic conversion and the liquid loading of the multiphase catalyst. In the left drawing, the production of isobutyraldehyde is shown relative to the liquid loading of the catalyst. In the right drawing the production of n-butyraldehyde is shown as a function of the liquid loading of the catalyst, both based upon Example 8.

Example 1

Rhodium bis(triphenyl phosphine)carbonyl chloride, Rh(P(phenyl)$_3$)$_2$CO Cl (27.6 mg) is dissolved in 40 ml (44.0 g) of diphenyl 2-ethyl hexyl phosphate and 50 ml chloroform, 14.36 g of the resulting catalyst solution is mixed with 27.9 g of 10 to 30 mesh, of a low surface area (approximately 5.70 m²/gm) porous alumina having a macropore volume (pores greater than 100A diameter) greater than 95 percent. The mixture is then heated at a temperature of 100°C to volatilize the chloroform. It is also found that a similar multiphase catalyst is obtained when the solution of the rhodium compound in the diphenyl 2-ethyl hexyl phosphate is dispersed directly on the alumina.

Thirty milliliters impregnated support are then charged into an 18-inch stainless-steel vertical reactor ½-inch in diameter. The resulting catalyst bed, which is 10 inches in height, is then covered with 4-inches of the above inert alumina packing as a preheater. Under the reaction conditions shown in the table below a product containing n-butyraldehyde and isobutyraldehyde in the ratio of normal/iso of 1.9 is produced. High boiling products are present in minor amounts in the condensed reactor effluent.

| Reaction Conditions | |
|---|---|
| Temperature: | 130°C |
| Pressure: | 704 psig |
| Liquid loading: | 0.45 |
| Contact time, Minutes: | 1.02 |
| Reactor Effluent Flow, cm³STP/min: | 373 |
| Hydrogen Flow, cm³STP/min: | 169 |
| Carbon Monoxide Flow, cm³STP/min: | 169 |
| Propylene Flow, cm³STP/min: | 113 |
| %conversion (based on reactor effluent flow rate): | 23 |

Example 2

In order to form a multiphase catalyst, 204.7 mg of Rh(P(phenyl)$_3$)$_2$CO Cl and 4.0 g of triphenyl phosphine are dissolved in 15.9 ml of (16.8 g) of diphenyl ether and 22.1 g of chloroform, after which 19.1 g of the resulting catalyst solution is added to 41.1 g of 10/30 mesh, low surface area porous alumina as described in Example 1. The chloroform is then volatilized to produce a liquid loading of 0.51. It is found that a substantially similar catalyst is also obtained as a multiphase composition when the said rhodium compound is dissolved in the diphenyl ether and such solution disposed directly upon the alumina.

Example 3

The multiphase catalyst is prepared from 27.0 mg of $Rh(As(phenyl)_3)_2CO\ Cl$ and 2.26 g triphenyl arsine dissolved in 10.0 g of diphenyl 2-ethyl hexyl phosphate; 8.04 g of the resulting catalyst solution is added to 40 ml (6.56 g) of 10 to 20 mesh, high surface area (approximately 750 $m^2$/gm) activated carbon.

Thirty milliliters of the impregnated support are then charged into the fixed-bed reactor described in Example 1, and covered with 4 ml of inert packing material as a preheater. The process conditions of Example 1 are used. A conversion level of 32 percent based upon the reactor effluent is achieved. The product consists mainly of n-butyraldehyde and iso-butyraldehyde in a n-/iso-ratio of 1.8 to 1.9, plus a minor proportion of some high boiling components.

The above multiphase catalyst is also readily prepared by adding a second solvent (chloroform) to achieve a liquid loading of about 0.50.

Example 4

The metal compound and liquid carrier are provided from 284.5 mg of $Co_2(PBu_3)_2(CO)_6$ dissolved in 10.0 g diphenyl 2-ethyl hexyl phosphate; 8.02 g of the resulting catalyst solution is added to 40 ml of low surface area, porous calcined diatomaceous earth having a density of 0.737 g/$cm^3$, a total pore volume of 0.929 $cm^3$/g., and greater than 95 percent macropore volume (pores greater than 100A diameter). Thirty milliliters of the impregnated support are then charged into the fixed-bed reactor and covered with 4 ml of inert packing material as a preheater. The reactor and process conditions of Example 1 are used with the exception that 190 $cm^3$ STP/min is the propylene flow rate and the temperature is 145°C. A conversion level of 9 percent based upon the reactor effluent is achieved. The product consists mainly of n-butyraldehyde and iso-butyraldehyde in a n-/iso- ratio of 2.0 with some high boiling components as minor components. The above multiphase catalyst is also readily prepared by adding a second solvent (chloroform) to achieve a liquid loading of about 0.48.

Example 5

The liquid-solid multiphase catalyst is prepared from 91.9 mg of $Rh(P(phenyl)_3)_3Cl$ dissolved in 1.0 g diethylene glycol and 10 ml methanol. The solution is then mixed with 10.0 g of 30 to 60 mesh, low surface area, porous diatomaceous earth. The pasty mixture is then dried in a vacuum oven at room temperature (25°C) overnight. Only the methanol is stripped off by this procedure and a liquid loading of 0.11 is achieved. 1.9 g of the impregnated support is then charged into the reactor of Example 5. Under the reaction conditions shown in the table below, 0.3 percent conversion to propane is achieved.

| Reaction Conditions | |
| --- | --- |
| Height of catalyst bed: | 3.5 cm |
| Temperature: | 40°C |

-Continued

| Reaction Conditions | |
| --- | --- |
| Hydrogen Flow, $cm^3$/sec: | 0.02 |
| Propylene Flow, $cm^3$/sec: | 0.02 |

Example 6

The multiphase catalyst is prepared using 161.4 mg $RhCl_3$, $3H_2O$ dissolved in 8.0 g diethylene glycol and mixed with 9.1 g 30 to 60 mesh, low surface area, calcined porous diatomaceous earth; 4.7 g of the free-flowing impregnated support is then charged into a 5-foot long ⅛ inch diameter thin-walled stainless steel tube. The tube is coiled and inserted into a thermostatted reaction chamber. Under the reaction conditions shown in the table below, unappreciable conversion to 2-butene is observed at 25°C while at 68°C, conversion levels of 3.4 percent trans-2-butene and 1.6 percent cis-2-butene are achieved. The above multiphase catalyst is also readily prepared by adding a second solvent (acetone) to achieve a liquid loading of about 0.46.

| Reaction Conditions | |
| --- | --- |
| 1-Butene Flow, $cm^3$/sec: | 0.16 at 25°C |
| | 0.03 at 68°C |

Example 7

In preparing the multiphase catalyst, 158.9 mg rhodium chloride hydrate, $RhCl_3·3H_2O$ is dissolved in 3.0 g water and mixed with 4.0 g 30/60 mesh, low surface area, calcined, porous diatomaceous earth. The mixture is vacuum dried at about 60°C for 6 hours to remove the water, to leave the salt on the carrier after which 1.61 g of the impregnated support is charged into a horizontal 26-cm long ¼ inch-O.D. stainless-steel tube and placed in the reactor system of Example 6. A very slight amount of isomerization activity for 1-butene is initially observed at 25°C but this disappears after several hours. This shows the importance of using a liquid catalyst component on a carrier.

Example 8

The multiphase catalyst is prepared using a non-volatile and a volatile solvent to obtain the desired degree of dispersion of the liquid catalytic component upon a porous, solid carrier.

The non-volatile catalyst solution is prepared from 74.2 mg of $Rh(P(phenyl)_3)_2COCl$ and 1.57 g triphenyl phosphine dissolved in 23.1 g benzyl butyl phthalate; a volatile solvent, in this case chloroform, is then added to the above non-volatile catalyst solution, the amount being carefully adjusted so that, after it evaporates from an impregnated support, a supported liquid-phase catalyst of desired liquid loading is achieved. In the preparation of the multiphase catalyst below, 2.45 $cm^3$ of the composite solution containing both the non-volatile catalyst solution and the volatile solvent is added to 2.0 grams of 3 to 8 mesh/inch, high surface area, high purity, silica gel; the impregnated support is dried slowly at room temperature (25°C) in air for several hours; it is then placed in an oven and vacuum dried at room temperature overnight; part of the resulting free-flowing impregnated support is then charged into the middle part of a 3.9-inch long ½-inch diameter stainless-steel tube; a presaturation bed composed of butyl benzyl phthalate dispersed upon 3 to 8 mesh silica gel precedes the catalyst bed and an adsorption bed composed of 3 to 8 mesh silica gel follows the catalyst bed in the stainless steel tube; the tube is then inserted into a thermostatted reaction chamber. Under the reaction conditions shown in the table below, a product containing n-butylraldehyde and isobutyraldehyde is produced. High boiling products are also present in minor amounts. The percent conversion based upon the amount of propylene, n-butyraldehyde, and isobutyraldehyde in the effluent gas stream is given as a function of the relative liquid loading, $V_L$, and flow rate, F, in the second table below.

| Reaction Conditions | |
| --- | --- |
| Vapor Pressure of butyl benzyl phthalate at 100°C (also vapor pressure when Rh compound dissolved) | less than 0.05 mm Hg |
| Temperature: | 135–137°C |
| Pressure: | 480–500 psig |
| % CO in reactant gas: | 47% |
| * $H_2$ in reactant gas: | 47% |
| % propylene in reactant gas: | 6% |
| Weight of silica gel, on a dry basis in each run: | 0.316 g |
| Silica Gel pore volume: | 1.16 cm³/gram |
| Silica gel surface area: | 340 m²/gram |
| Macropore volume (pores greater than 100A diameter) | more than 40% of the total pore volume |
| Particle density: | 0.678 gram/cm³ |
| Average size of silica gel particles: | 3 to 8 mesh |

The table below shows additional tests similar to the basic tests above conducted to illustrate the effect of catalyst loading.

| Test | % liquid loading | grams catalyst used | Summary of Results wt % catalyst loading 100 (gm catalyst gm multiphase catalyst) | gms silica gel present |
| --- | --- | --- | --- | --- |
|   | 0.50 | 0.4980 | 36.6 | 0.3155 |
| A | 0.50 | 0.4980 | 36.6 | 0.3155 |
|   | 0.81 | 0.6141 | 48.3 | 0.3172 |
| B | 0.81 | 0.6141 | 48.3 | 0.3172 |
|   | 0.30 | 0.4211 | 25.1 | 0.3154 |
| C | 0.30 | 0.4211 | 25.1 | 0.3154 |
|   | 0.65 | 0.5563 | 43.1 | 0.3167 |
| D | 0.65 | 0.5563 | 43.1 | 0.3167 |
|   | 0.90 | 0.6449 | 51.0 | 0.3162 |
| E | 0.90 | 0.6449 | 51.0 | 0.3162 |
| Test | Flow rate, cm³/min at reaction conditions | | Conversion % n-aldehyde | iso-aldehyde |
|   | 7.4 | | 4.9 | 2.2 |
| A | 3.7 | | 6.2 | 3.3 |
|   | 7.3 | | 2.6 | 1.3 |
| B | 3.8 | | 3.9 | 2.0 |
|   | 7.3 | | 1.8 | 1.2 |
| C | 3.6 | | 2.6 | 2.3 |
|   | 7.4 | | 3.4 | 1.8 |
| D | 3.8 | | 4.7 | 2.0 |
|   | 7.4 | | 1.7 | 0.8 |
| E | 3.7 | | 2.8 | 1.6 |

The general conditions for the hydroformylation reaction using the present multiphase catalyst are from 25°C to 300°C. Both atmospheric and subatmospheric conditions may be employed, or the pressure maintained on the reaction system in the range of from atmospheric to 3,000 psig. The hydroformylation reaction is conducted with olefinic hydrocarbons having from 2 to 6 carbon atoms in the presence of hydrogen gas and carbon monoxide.

When the solvent is changed from a low vapor pressure liquid, butylbenzylphthalate, having a vapor pressure of 0.05 mm Hg at 136°C, to a higher vapor pressure liquid, the composite catalyst is less effective. Thus, when ethylacetate is used as the sole solvent in the system described above, the catalyst rapidly deactivates under reaction conditions, so that the steady state conversion is less than 1 percent. The reaction conditions under study in this example are selected to show the nature of the optimum effect. At these conditions, e.g., fast flow rates and very small catalyst beds, the conversions are relatively low. A different range of operating parameters of the multiphase catalyst are employed for commercial operation, where conversions are substantially quantitative.

The liquid loading is a major controlling factor in the use of the present multiphase catalysts. The liquid loading and its relationship to conversion (percent aldehydic products relative to feed charge) is listed for the experiments of Example 8. This data is represented in the left drawing for isobutyraldehyde and in the right drawing for butyraldehyde, both obtained by the hydroformylation of propylene.

It is seen in the left drawing that the conversion relationship to liquid loading is not a direct proportionality, e.g., the use of greater amounts of catalyst does not result in a direct increase in conversion. Instead, the liquid loading passes through an optimum at about 50 percent liquid loading. The range of liquid loading employed in the practice of the invention is from 0.10 to 0.80 cm³ of the liquid catalytic component per cm³ pore volume carrier. A preferred range of liquid loading of the multiphase catalyst is from 0.15 to 0.75.

The present multiphase catalysts, limited to a specific range of liquid loading are differentiated from heterogeneous catalysts immersed in liquid reaction media in that the pore volumes of such heterogeneous catalysts are completely filled with liquid, i.e., a liquid loading of 1.0, corresponding to complete saturation. Examples of such heterogeneous catalysts immersed in liquid reaction media include platinum metal supported on porous charcoal, and Raney nickel.

The preferred range of catalyst loading in the present invention and as shown in the left drawing is unusually high in comparison with the prior art. For example the well known platinum on alumina catalysts typically employ catalyst loadings of about 0.5 to 1.0 weight percent, since any additional platinum loading is extremely less effective than the above basic loading. In contrast, in the present invention it has been found very useful to employ catalyst loading levels far above such a prior art limitation, e.g., 0.5 to 1 weight percent commonly employed in the prior art. For instance, in Example 8 of the present specification, the most effective catalyst loading is about 36 weight percent, which is at least 36 to 72 times greater than is typical of the prior art. The reason why the high present catalyst loadings can be used effectively in the multiphase catalysts of the present invention relates to the special advantages afforded by liquid-phase catalysts in which high dispersion and high effective utilization of expensive metal components such as rhodium and platinum are achieved.

The vapor phase catalytic processes in which the multiphase catalysts are employed include both fixed-bed and fluidized-bed operations. The range of particle sizes which may be achieved with the present multiphase catalysts permits the use of fine particles which are desirable in fluid-bed methods, as well as larger size particles which are preferable in fixed-bed processes.

Example 9

The catalyst solution of the multiphase catalyst is prepared by dissolving 0.41 g of sodium acetate, 0.20 g of $PdCl_2$, 0.81 g of $CuCl_2$ hydrate and 18 ml acetic acid in 10 ml diethyleneglycol; 2.42 g of the catalyst solution is mixed with 2.67 g 60 to 80 mesh, low surface area, calcined porous diatomaceos earth; 3.06 g of the impregnated support is dried to remove the acetic acid; then charged into a horizontal 26-cm long ¼ inch-O.D. stainless-steel tube and placed in the reactor system of Example 6; the catalyst tube is preceded by a presaturator maintained at 25°C containing 60 to 80 mesh, low surface area, calcined porous diatomaceous earth impregnated with water and charged into a horizontal 26-cm long ¼ inch-O.D. stainless-steel tube. Under the reaction conditions given in the table below a conversion level of 3.62 percent acetaldehyde is achieved.

| Reaction Conditions | |
|---|---|
| Ethylene Flow, $cm^3$ STP/min: | 2.3 |
| Oxygen Flow, $cm^3$ STP/min: | 4.6 |
| Temperature: | 37°C |
| Pressure: | 13 psig |
| Liquid loading: | about 0.36 |

Example 10

In the preparation of the catalyst, 1.86 g of a solid eutectic KCl-CuCl mixture (prepared by mixing 1.25 g KCl and 3.37 g CuCl) and 0.073 g of $PdCl_2$ are melted at 175°C and then mixed with 2.01 g 60/80 mesh, low surface area, calcined porous diatomaceous earth; the impregnated support is then charged into a horizontal 26-cm long ¼ inch-O.D. stainless-steel tube and placed in the reactor system of Example 9; the catalyst tube is preceded by the presaturator tube described in Example 12. Under the reaction conditions given in the table below a conversion level to 1.42 percent acetaldehyde is achieved.

| Reaction Conditions | |
|---|---|
| Ethylene Flow, $cm^3$ STP/min: | 1.8 |
| Oxygen Flow, $cm^3$ STP/min: | 1.4 |
| Temperature: | 178°C |
| Pressure: | 1 atmosphere |
| Liquid loading: | between 0.30 and 0.80 |

Example 11

The catalyst solution is prepared by dissolving 0.20 g $Na_2PdCl_4$, 0.79 g of $CuCl_2.2H_2O$, and 0.46 g sodium acetate in 20 ml acetic acid and 10 ml of dimethylacetamide; 1.26 g of the catalyst solution is mixed with 1.31 g 60 to 80 mesh, low surface area, calcined porous diatomaceous earth; the impregnated support is dried to remove the acetic acid and then charged into a horizontal 26-cm long ¼ inch-O.D. stainless-steel tube and placed in the reactor system of Example 9; the catalyst tube is preceeded by a ¼ inch-O.D. stainless-steel presaturator tube at 25°C containing 60/80 mesh, low surface area, calcined porous diatomaceous earth impregnated with acetic acid. Under the reaction conditions given in the table below, a conversion level of 6.8 percent vinyl acetate is achieved.

| Reaction Conditions | |
|---|---|
| Total Reactant Gas Flow, $cm^3$/min: | 0.83 |
| Per cent Ethylene in Reactant Gas: | 5% |
| Per cent Oxygen in Reactant Gas: | 19% |
| Per cent Nitrogen in Reactant Gas: | 76% |
| Temperature: | 25°C |
| Pressure: | 1 atmosphere |
| Liquid loading: | about 0.31 |

The general use of multiphase catalysts for the manufacture of esters by a vapor-phase process is particularly useful with feed stocks composed of olefinic hydrocarbons, with a preferred group having from 2 to 4 carbon atoms. The aliphatic hydrocarbons are charged as such, or are diluted with an inert gas such as nitrogen. The acid component which is reacted with the said aliphatic hydrocarbon may, for small-scale reactions, be charged from an impregnated source or presaturator as described above, or preferably is charged in vapor form to the reaction zone. The acid component is preferably an organic acid having from 1 to 4 carbon atoms. The mixture of the hydrocarbon and the acid components, preferably with gaseous oxygen present, is passed over the multiphase catalyst, for example at a temperature of from 25°C to 175°C, after which the reaction products are collected such as by condensing out the ester products. The pressure is not a critical variable and is usually maintained at from atmospheric pressure to 100 psig.

The multiphase catalysts for the manufacture of esters described above comprise a metal complex selected from the group consisting of Group VIII transition metals containing at least one inorganic ligand of the group consisting of fluoride, chloride, bromide, iodide, cyanide, thiocyanate, acetate, phosphate, hydroxide, as described above, a preferred group of ligands being the halide anions. Illustrative examples of suitable Group VIII transition metal compounds are, for example, $PdCl_2$, $PdBr_2$, $PtCl_2$, $CuPtBr_6$, $RhCl_3$, $H_2IrCl_6$, $RuCl_3$, as described above.

The action of the Group VIII metal complexes can be enhanced by the addition of a multivalent metal complex, selected from the group consisting of iron, copper, manganese, cobalt, chromium, and vanadium, which is soluble in the liquid reaction medium and is also capable of undergoing oxidation and reduction. Illustrative examples of such metal complexes are $FeCl_3$, $CuCl_2$, $CuBr_2$, $Cu(OAc)_2$, $M_nCl_2$, and $CoCl_2$ and the like.

The present catalysts are useful not only in the preparation of esters, but in more general terms, serve to catalyze chemical modification reactions of carbonyl containing compounds having from 1 to 8 carbon atoms, e.g., acids, ketones, aldehydes, and keto ethers and alcohols. Preferred examples of the multiphase liquid catalyst components include the acids and bases described above. Chemical modification reactions of carbonyl containing compounds include carbonyl addition reactions, such as cyanohydrin formation, aminonitrile formation, hemiacetal formation, aldol condensation, acetal formation, as well as esterification, hydrolysis, and amine condensation.

Example 12

The catalyst solution is prepared by dissolving 9.4 mg $Co(acetate)_2.4H_2O$ in 10 ml di-octyl phthalate and 10 ml of methanol; 2.33 g of the catalyst solution is mixed with 2.41 g 60 to 80 mesh, low surface area, calcined porous diatomaceous earth; 2.50 g of the impregnated support is dried to remove the methanol and then charged into a horizontal 26-cm long ¼ inch-O.D. stainless-steel tube and placed in the reactor system of Example 9; nitrogen gas is bubbled through cyclohexane at room temperature and then passed into the hot reactor tube. Under the reaction conditions given in the table below, a conversion level of 2.6 percent cyclohexanone and 2.4 percent cyclohexanol is achieved. Some adipic acid accumulated within the catalyst.

| Reaction Conditions | |
|---|---|
| Reactant Gas Flow, cm³/min: | 1.6 |
| % Cyclohexane in Reactant Gas: | 10 – 13% |
| % Nitrogen in Reactant Gas: | 67 – 90% |
| Temperature: | 178°C |
| Pressure: | 1 atmosphere |
| Liquid loading: | about 0.50 |

This example illustrates the oxidation of hydrocarbons, e.g., the transformation of cyclohexane to oxygenated products such as cyclohexanol and cyclohexanone. The multi-phase catalysts are of particular utility for the vapor-phase oxidation of both saturated and olefinic hydrocarbons, particularly those having from 1 to 6 carbon atoms to obtain various oxygenated products such as acids, ketones, aldehydes and alcohols. The oxidation process is conducted by passing the hydrocarbons together with gaseous oxygen or an oxygen containing gas mixture, for example, air or oxygen-enriched air over the catalyst. The hydrocarbon feed stock may also be diluted, for example with nitrogen gas, if desired. The products are then recovered by condensation and other normal recovery procedures. The temperature employed in the vapor phase oxidation is generally in the range of from 25°C to 300°C. The pressure is not a critical variable but is generally in the range of about atmospheric and subatmospheric pressures to 300 psig.

Example 13

In preparing the multiphase catalyst, 0.010 g lithium acetate is dissolved in 1.55 g diethylene glycol; 0.068 g of $RhCl_3 \cdot 3H_2O$ is then dissolved in 1.50 g of the acetate-glycol solution and 0.68 g acetone and mixed with 2.17 g 60–80 mesh, low surface area, calcined porous diatomaceous earth; the impregnated support is then charged into a horizontal 26-cm long ¼ inch-O.D. stainless-steel tube and placed in the reactor system of Example 9. Under the reaction conditions shown in the table below, 1-butene is converted to 61.6 percent trans-2-butene and 33.0 percent cis-2-butene.

| Reaction Conditions | |
|---|---|
| 1-Butene Flow, cm³/sec: | 3.2 |
| Temperature: | 68°C |
| Pressure: | 1 atmosphere |
| Liquid loading: | about 0.70 |

The present multiphase catalysts are of general utility in the bond isomerization of internal olefins having from 4 to 8 carbon atoms. The isomerization reaction is conducted by passing the vaporized olefinic hydrocarbon over the catalyst at a temperature in the range of from 25°C to 250°C.

Example 14

The multiphase catalyst is prepared using a non-volatile and a volatile solvent to obtain the desired degree of dispersion of a rhodium component and a halogen promoter dissolved in a non-volatile liquid and dispersed upon a porous solid carrier.

The volatile catalyst solution is prepared in the following manner: An amount of 0.9 gram of rhodium chloride trihydrate, having the formula $RhCl_3 \cdot 3H_2O$, is dissolved in 350 ml of ethanol. The solution is warmed to 60°C, and carbon monoxide is bubbled through the solution until a pale yellow color is obtained indicating the presence of a monovalent complex of rhodium. Then the solution is cooled and 53 ml of 57 wt. percent hydroiodic acid is added to the solution of the rhodium compound.

In the preparation of the multiphase catalyst, 4.0 ml of the volatile catalyst solution is added to 1.2 ml of pentaerythrityl tetravalerate and the resulting solution added to 4.5 grams of 3 to 8 mesh/inch, high surface area, high purity silica gel; the impregnated support is dried slowly at room temperature (25°C) in a vacuum for several hours to drive off part of the volatile solvents; it is then stored in a sealed bottle until the experimental run.

Ten (10) ml of the above multiphase catalyst is charged into an 18-inch Pyrex glass vertical reactor 30 mm in diameter. The resulting catalyst bed, 2 cm in depth, is covered with 100 ml of inert packing as a preheater. The catalyst bed is slowly heated to 150°C while under a 1 atm stream of nitrogen to drive off the remaining volatile components—ethanol, water, and excess iodine—from the multiphase catalyst. The gaseous reactants are then introduced into the reactor at the following reaction conditions:

| Reaction Conditions | |
|---|---|
| $CH_3OH$ Flow, moles/hour: | 0.27 |
| $CH_3I$ Flow, moles/hour: | 0.02 |
| CO Flow, moles/hour: | 0.50 |
| Temperature: | 148°C |
| Pressure: | 1 atmosphere |
| Partial Pressure of CO: | 0.65 atm or 9.5 psia |
| Liquid loading: | about 25%, e.g., 0.25 cm³ liquid catalytic component per cm³ pore volume of the porous solid carrier |

The reactor effluent contains the desired carboxylic acid product, including the ester of the acid product and alcohol feedstock, water and unreacted alcohol, carbon monoxide and halogen promoter, and the ester of valeric acid and alcohol feedstock. The selectivity of alcohol conversion to the desired carboxylic acid and its ester is essentially 100 percent. Chromatographic analysis indicates that no appreciable production of by-products such as aldehydes, higher boiling carboxylic acids (besides valeric acid) and/or alcohols, methane or carbon dioxide occurs. The ester of valeric acid in the effluent gas is obtained from the non-volatile solvent, pentaerythrityl tetravalerate, in which the valerate has been replaced by acetate during the course of the reaction.

The conversion obtained in this example amounts to 82 g. total acetate/g. Rh/hr. (acetate includes acetic acid and methyl acetate, which can be easily converted to acetic acid). The isolated product is found to have the following analysis in weight percent (on a valerate-free basis):

| | |
|---|---|
| methyl alcohol | 74.4 |
| methyl iodide | 23.5 |
| methyl acetate | 0.1 |
| acetic acid | 2.0 |

2.7 weight percent of the methanol fed to the reactor is converted to products.

When comparison experiments are conducted changing the pentaerythrityl tetravalerate solvent to ethylene glycol, propylene glycol, glutaric acid, adipic acid, and dimethyl adipate, respectively, it is found that the reaction rate at the end of 2 hours is at least 10 times less than with the pentaerythrityl tetravalerate, and similar product distributions are obtained.

In general, catalysts which are of particular utility in acid and ester production include the rhodium compounds and complexes which are dissolved or dispersed in the high-boiling solvents set forth above, and with the aforesaid components being disposed upon a porous solid carrier. A preferred embodiment is a rhodium complex containing at least one carbonyl (CO) ligand (as an inorganic ligand), and at least one halide ligand such as iodide, bromide or chloride. Examples of such catalysts are $[Rh(CO)_2(I)_2]^-$, $Rh_2(CO)_4(I)_2$, and $[Rh(CO)_2Br_2]^-$. Other desirable ligands include alkyl and aryl phosphines, amines and arsines, and chloro stannates. Examples of such catalysts include $[(n-C_4H_9)_4P]^+$ $[Rh(CO)_4(I)_2]^-$, $[(C_6H_5)_3P]_2Rh(CO)I$, $[(C_6H_5)_3AsCH_3]^+$ $[Rh(CO)_2(I)_2]^-$, $[(n-C_4H_9)_4N]^+$ $[Rh(CO)_2I_2]^-$, etc. However, the corresponding platinum, palladium, ruthenium, osmium, iridium, iron, nickel and cobalt compounds and complexes may be used. The metal complexes are preferable to simple metal salts for solution in the high-boiling solvent of the present multiphase catalyst.

This embodiment of the invention is concerned with carbonyl conversion reactions in which the multiphase catalyst is employed for the production of carboxylic acids and esters by carbonylation with carbon monoxide of a feedstock selected from the group consisting of alcohols (alkyl and aryl, such as methanol, ethanol, pentanols, decanols and phenols); alkyl and aryl halides, for example ethyl chloride; alkyl and aryl ethers such as dimethyl ether; and esters such as methyl acetate.

In accordance with the present invention, alcohols having n carbon atoms ($n$ is 1 to 10) are converted to a mixture comprised of an acid having $n + 1$ carbon atoms and the ester of the said alcohol with the said acid, by reacting the alcohol or an alcohol derivative in the vapor phase with carbon monoxide at temperatures from 50°C to 500°C and at partial pressures of carbon monoxide from 0.1 psia to 15,000 psia, preferably 5 psia to 3,000 psia, and more preferably 10 psia to 700 psia, although higher pressure may be employed, in the presence of the above catalyst system. For example, if acetic acid is the desired product, the feedstock may consist of methyl alcohol, or derivatives thereof, such as dimethyl ether, methyl acetate, methyl iodide and combinations of these.

In a typical carbonylation process, selective to carboxylic acid, one mole of carbon monoxide reacts with each hydroxyl group (molar basis). More or less carbon monoxide from the aforesaid stoichiometric amount, however, may be present. Carbon monoxide streams containing inert impurities such as hydrogen, carbon dioxide, methane, nitrogen, noble gases, water and paraffinic hydrocarbons having from 1 to 4 carbon atoms may be employed, if desired, for example, from an available plant gas stream, to good effect; however, in such cases total reactor pressure will have to be increased to maintain a desired carbon monoxide partial pressure. The concentration of carbon monoxide in the feed gas mixture is from 1 vol. percent to 99.9 vol. percent, a preferred range being from 10 vol. percent to 99.9 vol. percent.

The reaction rate is dependent upon catalyst concentration and temperature. Concentrations of the rhodium or other Group VIII component, calculated as the metal, between $10^{-6}$ moles per liter of the high-boiling liquid component and saturation are normally employed, with the preferred range being $10^{-5}$ moles per liter to 1 mole/liter.

A preferred embodiment of the present invention is to provide prior to the catalyst bed a feed presaturation bed supplied with the same high-boiling liquid component that is present within the catalyst bed. The high-boiling liquid component preferably has a lower vapor pressure than the ester or acid products of the reaction.

Example 15

The multiphase catalyst is prepared by a procedure identical to that given in Example 14, except that 12.0 ml of the volatile catalyst solution, 3.6 ml pentaerythrityl tetravalerate, 0.8 ml oleic acid, and 13.2 grams of silica gel are used to make the multiphase catalyst.

Thirty-two (32) ml of the above multiphase catalyst is charged into an 18-inch stainless-steel vertical reactor ½-inch in diameter. The resulting catalyst bed, about 9-inches in depth, is covered with about 7 ml of 3 to 8 mesh/inch, high surface area, high purity, silica gel as a preheater. The catalyst bed is slowly heated to 175°C while under a 200 psig stream of CO to drive off the remaining volatile components from the multiphase catalyst. The gaseous reactants are then introduced into the reactor at the following reactor conditions:

| Reaction Conditions | |
|---|---|
| $CH_3OH$ Flow, moles/hour: | 0.86 |
| $CH_3I$ Flow, moles/hour: | 0.02 |
| $H_2O$ Flow, moles/hour: | 0.12 |
| CO Flow, cm³STP/min: | 279 |
| Temperature: | 177°C |
| Total Pressure: | 200 psig |
| Liquid Loading: | about 22%, e.g., 0.22 cm³ liquid component per cm³ pore volume of the porous solid carrier |

The types of components found in the reactor effluent are the same as those given for Example 14. The conversion obtained in this example amounts to 42 g total acetate/g Rh/hr (acetates includes acetic acid and methyl acetate which can be easily converted to acetic acid). The isolated product is found to have the following analysis in weight percent,

| | |
|---|---|
| methyl ether | 0.4 |
| methyl alcohol | 79.4 |
| methyl iodide | 19.1 |
| methyl acetate | 1.2 |
| acetic acid | — |

0.64 weight % of the methanol fed to the reactor is converted to products. When using an analagous iridium compound, namely chlorocarbonylbis(triphenylphosphine) iridium(I), $Ir[P(C_6H_5)_3]_2COCl$, instead of the rhodium complex in the above experiment, a good yield of acetic acid and methyl acetate is also obtained.

When the reaction conditions in the above experiment are changed to:

| Reaction Conditions | |
|---|---|
| $CH_3OH$ Flow, moles/hour: | 0.27 |
| $CH_3I$ Flow, moles/hour: | 0.006 |
| $H_2O$ Flow, moles/hour: | 0.037 |
| CO Flow, $cm^3$STP/min: | 90. |
| Temperature: | 177°C |
| Total Pressure: | 200 psig |
| Liquid Loading: | about 22%, | the conversion obtained amounts to 41 g. total acetate/g Rh/hr. The isolated product is found to have the following analysis in weight percent,

| | |
|---|---|
| methyl ether | 0.7 |
| methyl alcohol | 81.0 |
| methyl iodide | 14.4 |
| methyl acetate | 3.6 |
| acetic acid | 0.2 |

2.0 weight percent of the methanol fed to the reactor is converted to products.

What is claimed is:

1. Process for the hydroformylation of unsaturated hydrocarbons having from 2 to 6 carbon atoms which comprises contacting the said unsaturated hydrocarbons in gaseous form at a temperature of from 25°C to 300°C and a pressure in the range of from atmospheric to 3,000 psig in the presence of carbon monoxide and hydrogen with a multiphase catalyst comprising a porous, solid carrier having dispersed thereon a liquid catalytic component including a solvent having a vapor pressure at 100°C of from $10^{-12}$ to 10 millimeters, and an aryl phosphine complex of rhodium, and being characterized by a liquid loading of the said multiphase catalyst in the range of from 0.10 to 0.80 $cm^3$ of the said liquid catalytic component per $cm^3$ pore volume of the said porous solid carrier.

2. Process for the hydrofromylation of propylene which comprises contacting the said propylene in gaseous form in the presence of carbon and hydrogen at a temperature of from 25°C to 300°C, and a pressure in the range of from atmospheric to 3,000 psig, in the presence of a multiphase catalyst comprising a porous, solid carrier having dispersed thereon a liquid catalytic component including a solvent having a vapor pressure of from $10^{-12}$ to 10 millimeters at 100°C, and rhodium carbonyl bis triphenyl phosphine chloride, and being characterized by a liquid loading of the said multiphase catalyst in the range of from 0.10 to 0.80 $cm^3$ of the said liquid catalytic component, per $cm^3$ pore volume of the said porous solid carrier.

* * * * *